(12) United States Patent
Hüffer et al.

(10) Patent No.: US 7,022,795 B1
(45) Date of Patent: Apr. 4, 2006

(54) HIGHLY CRYSTALLINE PROPYLENE HOMOPOLYMERS

(75) Inventors: Stephan Hüffer, Ludwigshafen (DE); Joachim Rösch, Ludwigshafen (DE); Stefan Seelert, Frankenthal (DE); Franz Langhauser, Ruppertsberg (DE); Dieter Lilge, Limburgerhof (DE); Roland Hingmann, Ladenburg (DE); Günther Schweier, Friedelsheim (DE)

(73) Assignee: Novolen Technology Holdings, C.V., (NL)

( * ) Notice: Subject to any disclaimer, the term of this patent is extended or adjusted under 35 U.S.C. 154(b) by 0 days.

(21) Appl. No.: 09/041,698

(22) Filed: Mar. 13, 1998

(51) Int. Cl.
C08F 110/06 (2006.01)
C08F 4/646 (2006.01)
C08F 4/649 (2006.01)

(52) U.S. Cl. ............... 526/351; 526/124.5; 526/124.6; 502/115; 502/116; 502/120; 502/125; 502/133; 502/134

(58) Field of Classification Search ............... 526/351, 526/124.5, 124.6; 502/115, 116, 120, 125, 502/133, 134
See application file for complete search history.

(56) References Cited

U.S. PATENT DOCUMENTS

| 4,857,613 A | 8/1989 | Zolk et al. |
| 5,244,854 A * | 9/1993 | Noristi et al. ............... 502/120 |
| 5,288,824 A | 2/1994 | Kerth et al. |

FOREIGN PATENT DOCUMENTS

| DE | 4242486 | 12/1992 |
| DE | 42 15 548 | 11/1993 |
| DE | 195 17 716 | 12/1995 |
| EP | 171 200 | 2/1986 |
| EP | 497 590 | 8/1992 |
| EP | 657 477 | 6/1995 |
| EP | 712 869 | 5/1996 |
| EP | 761 696 | 3/1997 |
| EP | 812 861 | 12/1997 |
| EP | 829 490 | 3/1998 |
| GB | 2 111 066 | 6/1983 |
| JP | 07-25946 | * 1/1995 |

OTHER PUBLICATIONS

BASF OZ 0050/47310.
Makromol. Chem. 178, 2335-2349 (1977).

* cited by examiner

*Primary Examiner*—Caixia Lu
(74) *Attorney, Agent, or Firm*—Dilworth & Barrese, LLP

(57) ABSTRACT

Propylene homopolymers, wherein, in their separation according to tacticity by first dissolving the polymers in boiling xylene, then cooling the solution to 25° C. at a cooling rate of 10° C./h and then, with ascending temperature, separating the propylene homopolymers into fractions of different tacticity, either one or more of the conditions that
  i) the fraction of propylene homopolymers which remains undissolved on heating the cooled propylene homopolymer solution to 112° C. is greater than 20% by weight or
  ii) the fraction of propylene homopolymers which remains undissolved on heating the cooled propylene homopolymer solution to 117° C. is greater than 8% by weight or
  iii) the fraction of propylene homopolymers which remains undissolved on heating the cooled propylene homopolymer solution to 122° C. is greater than 1% by weight,
are satisfied.

9 Claims, No Drawings

HIGHLY CRYSTALLINE PROPYLENE HOMOPOLYMERS

The present invention relates to propylene homopolymers, wherein, in their separation according to tacticity by first dissolving the polymers in boiling xylene, then cooling the solution to 25° C. at a cooling rate of 10° C./h and then, with ascending temperature, separating the propylene homopolymers into fractions of different tacticity, either one or more of the conditions that i) the fraction of propylene homopolymers which remains undissolved on heating the cooled propylene homopolymer solution to 112° C. is greater than 20% by weight or ii) the fraction of propylene homopolymers which remains undissolved on heating the cooled propylene homopolymer solution to 117° C. is greater than 8% by weight or iii) the fraction of propylene homopolymers which remains undissolved on heating the cooled propylene homopolymer solution to 122° C. is greater than 1% by weight, are satisfied.

The present invention furthermore relates to a process for the preparation of propylene homopolymers, the use of these propylene homopolymers for the production of films, fibers and moldings and the films, fibers and moldings comprising these polymers.

Catalyst systems of the Ziegler-Natta type are disclosed in DE-A 42 16 548, DE-A 44 19 438, EP-A 530 599 and U.S. Pat. No. 4,857,613. These systems are used in particular for polymerizing $C_2$–$C_{10}$-alk-1-enes and contain, inter alia, compounds of polyvalent titanium, aluminum halides and/or aluminum alkyls and electron donor compounds, in particular silicon compounds, ethers, carboxylic esters, ketones and lactones, which are used on the one hand in combination with the titanium component and on the other hand as a cocatalyst.

The preparation of the Ziegler-Natta catalysts is usually carried out in two steps. First, the titanium-containing solid component is prepared. This is then reacted with the cocatalyst. The polymerization is then carried out with the aid of the catalysts thus obtained.

U.S. Pat. No. 4,857,613 and U.S. Pat. No. 5,288,824 describe catalyst systems of the Ziegler-Natta type which, in addition to a titanium-containing solid component and an aluminum compound, also contain organic silane compounds as external electron donor compounds. The catalyst systems obtained are distinguished by, inter alia, good productivity and give polymers of propylene having high stereospecificity, ie. high isotacticity, a low chlorine content and good morphology, ie. low content of very fine particles.

In some applications of propylene homopolymers, for example for films for food which are produced from such polymers of propylene, or for the production of thin-walled containers, the propylene homopolymers must have, inter alia, only low contents of xylene-soluble fractions and high rigidity. Such polymers are distinguished in particular by high crystallinity. High rigidity is achieved, for example, by a high content of polymer chains having long, perfectly isotactic polymer sequences. Moreover, the propylene homopolymers should have a very low chlorine content, which can be achieved in particular by very high productivity of the catalyst system. The polymers of propylene which are disclosed in U.S. Pat. No. 4,857,613 and U.S. Pat. No. 5,288,824 do not meet these requirements to a sufficient extent.

The still unpublished German Patent Application 196 37 370.0 also describes a Ziegler-Natta catalyst system which has high productivity and stereospecificity and can be prepared by a simple process which is not very time-consuming.

It is an object of the present invention to remedy the disadvantages described and to provide propylene homopolymers which have, inter alia, a low content of xylene-soluble fractions and a low chlorine content and in particular have a high content of polymer chains having long, perfectly isotactic polymer sequences, which is reflected in a higher melting point, a higher crystallization rate and a higher material rigidity.

We have found that this object is achieved by the propylene homopolymers defined at the outset and a process for their preparation, the use of the propylene homopolymers for the production of films, fibers and moldings and the films, fibers and moldings comprising these polymers.

The novel propylene homopolymers are distinguished by a high content of polymer chains having long, perfectly isotactic polymer sequences. One method for the analytical determination of the fraction of polymer chains of different tacticity is TREF (Temperature Rising Elution Fractionation), in which the dissolution temperature of the polymer fraction corresponds to its average isotactic sequence length. For carrying out TREF, the propylene homopolymers are first dissolved in boiling xylene, the solution is then cooled at a constant cooling rate and then, with ascending temperature, the propylene homopolymers are separated into fractions of different tacticity. The composition of the propylene homopolymers can be described in terms of the fraction which remains insoluble on heating the cooled propylene homopolymer solution to a defined temperature.

The novel propylene homopolymers satisfy either one or, preferably two or all of the following conditions i) to iii):

i) The fraction which remains undissolved on heating the cooled propylene homopolymer solution to 112° C. is greater than 20, preferably greater than 30, particularly greater than 40, % by weight.

ii) The fraction which remains undissolved on heating the cooled propylene homopolymer solution to 117° C. is greater than 8, preferably greater than 12, particularly greater than 16, % by weight.

iii) The fraction which remains undissolved on heating the cooled propylene homopolymer solution to 122° C. is greater than 1, preferably greater than 2, particularly greater than 3, % by weight.

According to the invention, to determine the composition of the propylene homopolymers the TREF is carried out in the following manner:

1–10 g of the propylene polymer are dissolved in sufficient boiling xylene to form a 0.5–2% strength by weight solution. The boiling solution is then cooled at a linear cooling rate of 2° C./h to 15° C./h, preferably at 10° C./h, to 25° C. or a lower temperature, the major part of the polymer being precipitated. The crystal suspension is then transferred to a heatable extraction apparatus which corresponds to that described by W. Holtup in Makromol. Chem. 178 (1977), 2335 and is heated to the first elution temperature. The polypropylene crystals are then extracted at this temperature with vigorous mixing for at least 10 minutes. The polymer solution is then discharged while the polymer crystals remain behind in the extractor. The dissolved polymer is precipitated in cold acetone (temperature<0° C.), filtered off and dried under reduced pressure until the weight is constant.

The extractor is then heated to the next elution temperature and xylene at the same temperature is added in the same amount as that used for the dissolution. Thereafter, extraction is once again carried out for at least 10 minutes with vigorous mixing, and the polymer solution is discharged, and the dissolved polymer is precipitated in cold acetone, filtered off and dried. These steps are repeated until the total polymer has dissolved.

The novel propylene homopolymers are obtainable by polymerizing propylene in the presence of a Ziegler-Natta catalyst system containing, as active components, a titanium-containing solid component a) which is obtained by reacting a titanium halide with a compound of magnesium, an inorganic oxide as a carrier, a $C_1$–$C_8$-alkanol and a carboxylic ester as an electron donor compound, and, as cocatalysts, an aluminum compound b) and a further electron donor compound c).

For the preparation of the titanium-containing solid components a), the titanium halides used are the halides of trivalent or tetravalent titanium, for example $TiBr_3$, $TiBr_4$, $TiCl_3$ or $TiCl_4$, or alkoxytitanium halides, such as $Ti(OCH_3)Cl_3$, $Ti(OC_2H_5)Cl_3$, $Ti(O\text{-iso-}C_3H_7)Cl_3$, $Ti(O\text{-n-}C_4H_9)Cl_3$, $Ti(OC_2H_5)Br_3$, $Ti(O\text{-n-}C_4H_9)Br_3$, $Ti(OCH_3)_2Cl_2$, $Ti(OC_2H_5)_2Cl_2$, $Ti(O\text{-n-}C_4H_9)_2Cl_2$, $Ti(OC_2H_5)_2Br_2$, $Ti(OCH_3)_3Cl$, $Ti(OC_2H_5)_3Cl$, $Ti(O\text{-n-}C_4H_9)_3Cl$ or $Ti(OC_2H_5)_3Br$, the titanium halides, which contain only halogen in addition to titanium, especially the titanium chlorides and in particular titanium tetrachloride being preferred. According to the invention, the titanium halides may also be used as mixtures with one another or as mixtures with further titanium compounds. Examples of suitable further titanium compounds are titanium alcoholates such as $Ti(OCH_3)_4$, $Ti(OC_2H_5)_4$ or $Ti(O\text{-n-}C_4H_9)_4$. The titanium halides are preferably used alone.

Furthermore, a chlorine-free compound of magnesium or a mixture of different chlorine-free compounds of magnesium are used in the preparation of the titanium-containing solid component. According to the invention, chlorine-free compounds of magnesium are to be understood as meaning those which contain no halogen in their structural formula. However, the amounts of halogen contained as impurities in the novel chlorine-free compounds of magnesium should not exceed 5, in particular 2, % by weight. Preferably suitable chlorine-free compounds of magnesium are alkylmagnesium and arylmagnesium as well as alkoxymagnesium and aryloxymagnesium compounds, di($C_1$–$C_{10}$-alkyl) magnesium compounds being preferably used. Examples of novel chlorine-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propoxymagnesium, diisopropoxymagnesium, di-n-butoxymagnesium, di-sec-butoxymagnesium, di-tert-butoxymagnesium, diamyloxymagnesium, n-butoxyethoxymagnesium, n-butoxy-sec-butoxymagnesium, n-butoxyoctyloxymagnesium and diphenoxymagnesium. Among these, n-butylethylmagnesium and n-butyloctylmagnesium are particularly preferred.

In addition, the titanium-containing solid component a) contains at least one inorganic oxide as a carrier. The carrier used is as a rule a finely divided inorganic oxide which has a mean particle diameter of from 5 to 200 µm, preferably from 15 to 100 µm, in particular from 20 to 70 µm. The mean particle diameter is to be understood here as meaning the volume-related mean value (median value) of the particle size distribution determined by Coulter counter analysis according to ASTM Standard D 4438.

The particles of the finely divided inorganic oxide are preferably composed of primary particles which have a mean particle diameter of from 1 to 20 µm, in particular from 3 to 10 µm. The primary particles are porous, granular oxide particles which are obtained from a hydrogel of the inorganic oxide by milling. It is also possible to sieve the primary particles before they are further processed.

Furthermore, the inorganic oxide preferably to be used also has cavities or channels possessing an average diameter of from 0.1 to 20 µm, in particular from 1 to 15 µm. With an average diameter of from 0.1 to 20 µm, in particular from 1 to 15 µn, the macroscopic volume fraction, based on the total particle, is from 5 to 30%, in particular from 10 to 30%.

The mean particle diameter of the primary particles and the macroscopic volume fraction of the cavities and channels of the inorganic oxide are advantageously determined by image analysis with the aid of scanning electron microscopy or by electron probe microanalysis, in each case at particle surfaces and at particle cross sections of the inorganic oxide. The electron micrographs obtained are evaluated and the mean diameter of the primary particles and the macroscopic volume fraction of the cavities and channels are determined therefrom. The image analysis is preferably carried out by converting the electron microscope data into a gray value binary image and carrying out digital evaluation by means of a suitable computer program.

The inorganic oxide preferably to be used can be obtained, for example, by spray-drying of the milled hydrogel, which is mixed with water or an aliphatic alcohol for this purpose. Such finely divided inorganic oxides are also commercially available.

The finely divided inorganic oxide furthermore usually has a pore volume of from 0.1 to 10, preferably from 1.0 to 4.0, $cm^3/g$ and a specific surface area of from 10 to 1000, preferably from 100 to 500, $m^2/g$, where these are to be understood as the values determined by mercury porosimetry according to DIN 66133 or by nitrogen adsorption according to DIN 66131.

The pH of the inorganic oxide, ie. the negative logarithm to the base 10 of the proton concentration, is preferably from 1 to 6.5, in particular from 2 to 6, particularly preferably from 3.5 to 5.5.

Particularly suitable inorganic oxides are the oxides of silicon, of aluminum, of titanium and of the metals of main group I or II of the Periodic Table. In addition to alumina or magnesium oxide or sheet silicate, very particularly preferably used oxide is silica (silica gel). Mixed oxides, such as aluminum silicates or magnesium silicates, may also be used.

The inorganic oxides used as carriers contain hydroxyl groups on their surface. By eliminating water, it is possible to use the content of OH groups or to eliminate it completely. This can be effected by thermal or chemical treatment. A thermal treatment is usually carried out by heating the inorganic oxide for from 1 to 24, preferably from 2 to 20, in particular from 3 to 12, hours at 250 to 900° C., preferably 600 to 800° C. The hydroxyl groups can also be removed chemically by treating the inorganic oxides with conventional drying agents such as $SiCl_4$, chlorosilanes or alkylaluminums. Preferably used inorganic oxides contain from 0.5 to 5% by weight of water. The water content is usually determined by drying the inorganic oxide at 160° C. under atmospheric pressure until the weight is constant. The decrease in weight corresponds to the original water content.

Preferably, from 0.1 to 1.0, in particular from 0.2 to 0.5, mol of the chlorine-free compound of magnesium is used per mole of the inorganic oxide in the preparation of this titanium-containing solid component a).

In the preparation of the titanium-containing solid component a), $C_1$–$C_8$-alkanols, such as methanol, ethanol, n-propanol, isopropanol, n-butanol, sec-butanol, tert-butanol, isobutanol, n-hexanol, n-heptanol, n-octanol or 2-ethylhexanol, or mixtures thereof are furthermore employed. Ethanol is preferably used.

The titanium-containing solid component a) furthermore contains electron donor compounds, for example mono- or polyfunctional carboxylic acids, carboxylic anhydrides or carboxylic esters, and ketones, ethers, alcohols, lactones or organophosphorus or organosilicon compounds.

Preferably used electron donor compounds within the titanium-containing solid component are carboxylic acid derivatives and, in particular, phthalic acid derivatives of the general formula (II)

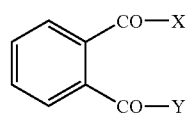

(II)

where X and Y are each chlorine or bromine or $C_1$–$C_{10}$-alkoxy or together are oxygen as an anhydride function. Particularly preferred electron donor compounds are phthalic esters, where X and Y are each $C_1$–$C_8$-alkoxy, for example methoxy, ethoxy, n-propoxy, isopropoxy, n-butoxy, sec-butoxy, isobutoxy or tert-butoxy. Examples of preferably used phthalic esters are diethyl phthalate, di-n-butylphthalate, diisobutyl phthalate, dipentyl phthalate, dihexylphthalate, di-n-heptylphthalate, di-n-octylphthalate and di-2-ethylhexylphthalate.

Other preferred electron donor compounds within the titanium-containing solid component are diesters of 3- or 4-membered, unsubstituted or substituted cycloalkane-1,2-dicarboxylic acids and monoesters of substituted benzophenone-2-carboxylic acids or substituted benzophenone-2-carboxylic acids. The hydroxy compounds used in the case of these esters are the alkanols usually employed in esterification reactions, for example $C_1$–$C_{15}$-alkanols or $C_5$–$C_7$-cycloalkanols, which in turn may carry one or more $C_1$–$C_{10}$-alkyl groups, and $C_6$–$C_{10}$-phenols.

It is also possible to use mixtures of different electron donor compounds.

The titanium-containing solid component a) can be prepared by methods known per se which are described, for example, in EP-A 171 200, GB-A 2 111 066, U.S. Pat. No. 4,857,613 and U.S. Pat. No. 5,288,824. However, in the first stage of their preparation, the chlorine-free compound of magnesium in an inert solvent is used and this is reacted with the carrier and with the $C_1$–$C_8$-alkanol to give a chlorine-free intermediate, which is advantageously further processed without purification or extraction.

In the preparation of the titanium-containing solid component a), the following two-stage process is preferably used:

In the first stage, a solution of the chlorine-free compound of magnesium is first added to the inorganic oxide in an inert solvent, preferably a liquid alkane or an aromatic hydrocarbon, eg. toluene or ethylbenzene, after which this mixture is allowed to react, as a rule with stirring, for from 0.5 to 5 hours at from 10 to 120° C. Thereafter, the $C_1$–$C_8$-alkanol is added in at least a 1.3-fold, preferably 1.6-fold to 3-fold, in particular 1.8-fold to 2.0-fold, molar excess, based on the magnesium-containing compound, usually with constant stirring, at from −20 to 80° C., preferably from 0 to 40° C. This gives a chlorine-free intermediate, which is preferably further processed without purification or extraction. After from about 10 to 120 minutes, preferably after from about 20 to 60 minutes, the titanium halide and the electron donor compound are added to this intermediate at from 10 to 50° C. From 1 to 15, preferably from 2 to 5, mol of the titanium halide and from 0.01 to 1, in particular from 0.3 to 0.7, mol of the electron donor compound are used per mol of magnesium of the solid obtained from the first stage. This mixture is allowed to react, generally with stirring, for at least 10 minutes, preferably 30 minutes, in particular from 45 to 90 minutes, at from 10 to 150° C., in particular from 60 to 130° C., and the solid substance thus obtained is then filtered off and washed with a $C_7$–$C_{10}$-alkylbenzene, preferably with ethylbenzene.

In the second stage, the solid obtained from the first stage is extracted at from 100 to 150° C. with excess titanium tetrachloride or with a solution, present in excess, of titanium tetrachloride in an inert solvent, preferably a $C_7$–$C_{10}$-alkylbenzene, the solvent containing at least 5% by weight of titanium tetrachloride. Extraction is carried out as a rule for at least 30 minutes. The product is then washed with a liquid alkane until the titanium tetrachloride content of the wash liquid is less than 2% by weight.

The titanium-containing solid component a) obtainable in this manner is used with cocatalysts as the Ziegler-Natta catalyst system. Suitable cocatalysts include aluminum compounds b) and further electron donor compounds c).

Suitable aluminum compounds b) are, besides trialkylaluminum, also those compounds in which an alkyl group is replaced by an alkoxy group or by a halogen atom, for example by chlorine or bromine. The alkyl groups can be identical to or different from one another. Linear or branched alkyl groups are possible. Trialkylaluminum compounds whose alkyl groups are each of 1 to 8 carbon atoms, for example trimethylaluminum, triethylaluminum, triisobutylaluminum, trioctylaluminum or methyldiethylaluminum or mixtures thereof, are preferably used.

In addition to the aluminum compound b), electron donor compounds c), for example mono- or polyfunctional carboxylic acids, carboxylic anhydrides and carboxylic esters, and ketones, ethers, alcohols, lactones and organophosphorus and organosilicon compounds, are used as further cocatalysts, it being possible for the electron donor compounds c) to be identical to or different from the electron donor compounds used for the preparation of the titanium-containing solid component a). Preferred electron donor compounds are organosilicon compounds of the general formula (I)

$$R^1_n Si(OR^2)_{4-n} \qquad (I)$$

where the radicals $R^1$ are identical or different and are $C_1$–$C_{20}$-alkyl, 5- to 7-membered cycloalkyl, which in turn may be substituted by $C_1$–$C_{10}$-alkyl, or are $C_6$–$C_{18}$-aryl or $C_6$–$C_{18}$-aryl-$C_1$–$C_{10}$-alkyl, the radicals $R^2$ are identical or different and are each $C_1$–$C_{20}$-alkyl and n is 1, 2 or 3. Particularly preferred compounds are those in which $R^1$ is $C_1$–$C_8$-alkyl or 5- to 7-membered cycloalkyl, $R^2$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclohexylsilane, dimethoxycyclohexylmethylsilane, dimethoxydicyclopentylsilane, dimethoxyisopropyl-tert-butylsilane, dimethoxyisobutyl-sec-butylsilane and dimethoxyisopropyl-sec-butylsilane are particularly noteworthy.

The compounds b) and c) which act as cocatalysts can be used individually in any desired order or as a mixture. They can be allowed to act in succession or together on the titanium-containing solid component a). This is usually effected at from 0 to 150° C., in particular from 20 to 90° C., and at from 1 to 100, in particular from 1 to 40, bar.

The cocatalysts b) are preferably used in an amount such that the atomic ratio of aluminum from the aluminum component b) to titanium from the titanium-containing solid component a) is from 10:1 to 800:1, in particular from 20:1 to 200:1.

In the process used for the preparation of the novel propylene homopolymers, inter alia, the molar ratio of the aluminum compound b) to the further electron donor compound c) is from 1.5:1 to 9:1, in particular from 2:1 to 8:1. If a molar ratio greater than 9:1 is used, the stereospecificity of the propylene homopolymers formed is insufficient. If the ratio is less than 1.5:1, the process is not very advantageous from the economic point of view, in particular owing to the large amounts of the further electron donor compound c) then used.

The preparation of the novel propylene homopolymers can be carried out in the conventional reactors used for the polymerization of propylene, either batchwise or, preferably, continuously, inter alia as a suspension polymerization or, preferably, as a gas-phase polymerization. Suitable reactors are, inter alia, continuously operated stirred reactors, loop reactors or fluidized-bed reactors, continuously operated stirred reactors which contain a fixed bed of finely divided polymer which is usually kept in motion by suitable stirring apparatuses being preferred. The reaction can of course also be carried out in a plurality of reactors connected in series (reactor cascade).

The process which leads to the novel propylene homopolymers and is likewise novel is carried out by polymerizing propylene at from 20 to 150° C. and from 1 to 100 bar and with average residence times of from 0.5 to 5 hours. Temperatures of from 60 to 90° C., pressures of from 20 to 35 bar and average residence times of from 0.5 to 3 hours are preferred.

The molar mass of the novel propylene homopolymers can be controlled and established over a wide range by adding regulators conventionally used in polymerization technology, for example hydrogen. It is also possible concomitantly to use inert solvents, for example toluene or hexane, inert gases, such as nitrogen or argon, and relatively small amounts of polypropylene powder. The novel propylene homopolymers preferably have molar masses (weight average) of from 20,000 to 500,000 g/mol. Their melt flow rates at 230° C. and under a weight of 2.16 kg according to ISO 1133, are from 0.1 to 100, in particular from 0.5 to 50, g/10 min.

Additives such as stabilizers, lubricants and mold release agents, fillers, nucleating agents, antistatic agents, dyes, pigments or flameproofing agents may be added in the usual amounts to the novel propylene homopolymers before they are used. As a rule, said additives are incorporated into the polymer during the granulation of the polymerization products obtained in powder form.

Conventional stabilizers are antioxidants, such as sterically hindered phenols, processing stabilizers, such as phosphites or phosphonites, acid acceptors, such as calcium stearate or zinc stearate or dihydrotalcite, sterically hindered amines or UV stabilizers. In general, the novel propylene homopolymers contain one or more of the stabilizers in amounts up to 2% by weight.

Suitable lubricants and mold release agents are, for example, fatty acids, calcium or zinc salts of fatty acids, fatty amines or low molecular weight polyolefin waxes, which are usually used in concentrations up to 2% by weight.

Examples of suitable fillers for the random propylene copolymers are talc, chalk or glass fibers, amounts up to 50% by weight being used here.

Suitable nucleating agents are, for example, inorganic additives, such as talc, silica or kaolin, salts of mono- or polycarboxylic acids, such as sodium benzoate or aluminum tert-butylbenzoate, dibenzylidenesorbitol or the $C_1$–$C_8$-alkyl-substituted derivatives thereof, such as methyl- or dimethyldibenzylidenesorbitol, or salts of diesters of posphoric acid, such as sodium 2,2'-methylenebis(4,6-di-tert-butylphenyl) phosphate. Their content is as a rule up to 2% by weight.

Such additives are generally commercially available and are described, for example, in Gächter/Müller, Plastics Additives Handbook, 4th Edition, Hansa Publishers, Munich, 1993.

Compared with the propylene homopolymers known to date, the novel propylene homopolymers are distinguished in particular by a higher content of polymer chains having long, perfectly isotactic polymer sequences and further reduced xylene-soluble fractions. This manifests itself in, inter alia, a higher melting point, a higher crystallization rate and higher material rigidity and increase in the most highly isotactic TREF fractions. Moreover, the novel propylene homopolymers have reduced chlorine contents. The productivity of the process used for the preparation of these propylene homopolymers is substantially increased compared with the known processes.

Owing to their good mechanical properties, the novel propylene homopolymers are particularly suitable for the production of films, fibers and moldings.

EXAMPLES

The following tests were carried out to characterize the polymers:

Determination of the Melt Flow Rate (MFR):
according to ISO standard 1133, at 230° C. and under a weight of 2.16 kg.

Determination of the Xylene-Soluble Fraction:
according to ISO standard 1873-1:1991.

Fractionation According to Tacticity:
The separation of the propylene homopolymer with respect to the tacticity was carried out by preparative fractionation by temperature rising elution fractionation (TREF). For this purpose, 5 g of each propylene homopolymer were dissolved in 400 ml of boiling xylene and the solution was then linearly cooled to 25° C. at a cooling rate of 10° C./h, the major part of the polymer being precipitated.

The crystal suspension was transferred to a thermostatable 500 ml extraction apparatus which corresponds to that described by W. Holtup in Makromol. Chem. 178 (1977), 2335, and heated to the first elution temperature. The polypropylene crystals were extracted at this temperature with vigorous mixing for 15 minutes. The polymer solution was then discharged while the polypropylene crystals remained behind in the extractor. The dissolved polymer was precipitated in cold acetone (temperature<0° C.) and the precipitate was filtered off and was dried for from 4 to 5 hours at 100° C. under reduced pressure.

The extractor was then heated to the next elution temperature and 400 ml of xylene at the same temperature were added. Extraction was once again carried out for 15 minutes with vigorous mixing, the polymer solution was discharged, the dissolved polymer was precipitated in cold acetone and the precipitate was filtered off and dried. These steps were repeated until the total propylene homopolymer had dissolved.

The TREF fractions shown in the table describe the amount which has dissolved in the extraction at the stated temperature. The % by weight data are based here on the sample weight of 5 g, ie. owing to weighing and filtration losses, the fractions do not sum to exactly 100% by weight.

The amount of the propylene homopolymers which remains undissolved in xylene at a given temperature can be calculated as the sum of the fractions which have gone into solution at higher elution temperatures.

Determination of the Q Value:

The Q value is the ratio of the weight average molar mass ($M_w$) to the number average molar mass ($M_n$) of the polymers. The weight average ($M_w$) and number average ($M_n$) molar masses were determined by gel permeation chromatography (GPC) at 135° C. in trichlorobenzene.

Determination of the DSC Melting Point:

according to ISO standard 3146 at a heating rate of 10° C.

Determination of the Modulus of Elasticity (Tensile Modulus of Elasticity):

according to ISO standard 527-2, at a measuring temperature of 23° C.

Determination of the Chlorine Content:

The chlorine content of the polymers was determined microcoulometrically according to DIN 51408 Part 2.

Determination of the Productivity:

The productivity is the amount of polymer in grams which was obtained per gram of titanium-containing solid component used.

Determination of the Mean Particle Diameter:

To determine the mean particle diameter of the silica gel, the particle size distribution of the silica gel particles was determined by Coulter counter analysis according to ASTM Standard D 4438 and the volume-related mean value (median value) was calculated therefrom.

Determination of the Pore Volume:

By mercury porosimetry according to DIN 66133

Determination of the Specific Surface Area:

By nitrogen adsorption according to DIN 66131

Determination of the Water Content:

To determine the water content, 5 g of silica gel were dried at 160° C. under atmospheric pressure for 15 minutes (weight constancy). The decrease in weight corresponds to the original water content.

Determination of the Macroscopic Volume Fraction of the Cavities and Channels:

The average particle size of the primary particles and the macroscopic volume fraction of the cavities and channels of the silica gel used were determined with the aid of scanning electron microscopy or electron probe microanalysis, in each case at particle surfaces and at particle cross sections of the silica gel. The electron micrographs obtained were converted into a gray value binary image and evaluated by means of the software package Analysis from SIS Digital.

Example 1 a) Preparation of the Titanium-Containing Solid Component

In a first stage, a solution of n-butyloctylmagnesium in n-heptane was added to finely divided, spherical silica gel ($SiO_2$), which had a mean particle diameter of 45 μm, a pore volume of 1.5 cm$^3$/g, a specific surface area of 260 m$^2$/g and a water content of 2.7% by weight, 0.3 mol of magnesium compound being used per mol of $SiO_2$. The finely divided silica gel had a pH of 5.5 and was additionally characterized by a mean particle size of the primary particles of 3–5 μm and by cavities and channels having a diameter of 3–5 μm, the macroscopic volume fraction, based on the total particle, of the cavities and channels being about 25%. The solution was stirred for 30 minutes at 95° C. and then cooled to 20° C., after which a 1.8-fold molar amount, based on the organomagnesium compound, of ethanol in 20 ml of heptane was added with cooling, the reaction temperature being kept below 45° C. After 45 minutes, 4.2 mol of titanium tetrachloride and 0.6 mol of di-n-butyl phthalate, based in each case on 1 mol of magnesium, were added to the chlorine-free intermediate, without purification or extraction step, with continuous stirring. Stirring was then carried out for 1 hour at 100° C. and the resulting solid substance was filtered off and was washed several times with ethylbenzene.

The solid product obtained therefrom was extracted for 90 minutes in a second stage at 125° C. with a 10% strength by volume solution of titanium tetrachloride in ethylbenzene. Thereafter, the solid product was separated from the extracting agent by filtration and was washed with n-heptane until the extracting agent contained only 0.3% by weight of titanium tetrachloride.

The titanium-containing solid component contained 3.8% by weight of Ti 7.2% by weight of Mg 28.1% by weight of Cl.

b) Polymerization of Propylene

The polymerization was carried out in a vertically stirred gas-phase reactor having a useful volume of 800 l, in the presence of hydrogen as a molar mass regulator. The reactor contained an agitated fixed bed of finely divided polymer.

Gaseous propylene was passed into the gas-phase reactor at 32 bar and 80° C. In an average residence time of 1.5 hours, polymerization was carried out continuously with the aid of the titanium-containing solid component described in Example 1a), 6.6 g of the titanium-containing solid component 1a), and 360 mmol of triethylaluminum and 45 mmol of dimethoxydicyclopentylsilane, as cocatalyst, being used per hour.

After the end of the gas-phase polymerization, a propylene homopolymer having a melt flow rate of 11.2 g/10 min, at 230° C. and 2.16 kg (according to ISO 1133) was obtained.

Comparative Example A a) Preparation of the Titanium-Containing Solid Component In a first stage, a solution of n-butyloctylmagnesium in n-heptane was added to the finely divided spherical silica gel also used in Example 1, 0.3 mol of magnesium compound being used per mol of $SiO_2$. The solution was stirred for 45 minutes at 95° C. and then cooled to 20° C., after which the 10-fold molar amount, based on the organomagnesium compound, of hydrogen chloride was passed in. After 60 minutes, 3 mol of ethanol per mol of magnesium were added to the reaction product with continuous stirring. This mixture was stirred for 0.5 hour at 80° C. and then 7.2 mol of titanium tetrachloride and 0.5 mol of di-n-butyl phthalate, based in each case on 1 mol of magnesium, were added. Thereafter, stirring was carried out for 1 hour at 100° C. and the solid substance thus obtained was filtered off and washed several times with ethylbenzene.

The solid product thus obtained was extracted for 3 hours at 125° C. with a 10% strength by volume solution of titanium tetrachloride in ethylbenzene. Thereafter, the solid product was separated from the extracting agent by filtration and was washed with n-heptane until the extracting agent contained only 0.3% by weight of titanium tetrachloride.

The titanium-containing solid component contained
3.5% by weight of Ti
7.4% by weight of Mg
28.2% by weight of Cl.

Propylene was polymerized similarly to novel Example 1, under the same conditions, except that the titanium-containing solid component described in Example Aa) was used. 8.4 g/h of the titanium-containing solid component Aa), 360 mmol of triethylaluminum and 45 mmol of dimethoxydicyclopentylsilane, were used:

After the end of the gas-phase polymerization, a propylene homopolymer having a melt flow rate of 12.1 g/10 min at 230° C. and 2.16 kg (according to ISO 1133) was obtained.

Example 2

The novel Example 1 was repeated in a similar manner in a vertically stirred 800 l gas-phase reactor. Propylene was polymerized continuously in an average residence time of 1.5 hours, 5.7 g/h of the titanium-containing solid component 1a) described in Example 1a), 360 mmol/h of the aluminum component and 120 mmol/h of dimethoxydicyclopentylsilane, being used as catalyst components.

After the end of the gas-phase polymerization, a propylene homopolymer having a melt flow rate of 12.3 g/10 min at 230° C. and 2.16 kg (according to ISO 1133) was obtained.

Comparative Example B

Propylene was polymerized similarly to novel Example 2, under the same conditions, except that the titanium-containing solid component Aa) prepared in Comparative Example Aa) was used.

After the end of the gas-phase polymerization, a propylene homopolymer having a melt flow rate of 13.0 g/10 min at 230° C. and 2.16 kg (according to ISO 1133) was obtained.

Example 3

The novel Example 1 was repeated in a similar manner in a vertically stirred 800 l gas-phase reactor. Propylene was polymerized continuously in an average residence time of 1.5 hours, 7.3 g/h of the titanium-containing solid component 1a) described in Example 1a), 360 mmol/h of the aluminum component and 45 mmol/h of dimethoxyisobutylisopropylsilane, being used as catalyst components.

After the end of the gas-phase polymerization, a propylene homopolymer having a melt flow rate of 12.4 g/10 min at 230° C. and 2.16 kg (according to ISO 1133) was obtained.

Comparative Example C

Propylene was polymerized similarly to novel Example 3, under the same conditions, except that the titanium-containing solid component Aa) prepared in Comparative Example Aa) was used.

After the end of the gas-phase polymerization, a propylene homopolymer having a melt flow rate of 12.8 g/10 min at 230° C. and 2.16 kg (according to ISO 1133) was obtained.

The table below shows the following properties of the propylene homopolymers obtained in each case, both for novel Examples 1 to 3 and for Comparative Examples A to C: xylene-soluble fraction, amount of TREF fractions (measure of the stereospecificity of the polymer) and the xylene-insoluble fraction calculated therefrom, Q value, melting point, rigidity (tensile modulus of elasticity) and chlorine content. In addition, the molar ratios of the aluminum compounds b) used in the polymerization and further electron donor compounds c) and the productivities of the catalyst systems used are shown.

TABLE

|  | Example 1 | Comparative Example A | Example 2 | Comparative Example B | Example 3 | Comparative Example C |
|---|---|---|---|---|---|---|
| Molar ratio aluminum compound b)/electron donor c) | 8:1 | 8:1 | 3:1 | 3:1 | 8:1 | 8:1 |
| Xylene-soluble fraction [% by weight] | 0.6 | 0.9 | 0.4 | 0.7 | 0.6 | 1.1 |
| TREF fractions: | | | | | | |
| up to 107° C. [% by weight] | 17.7 | 29.3 | 12.4 | 25.7 | 19.9 | 32.0 |
| 112° C. [% by weight] | 32.6 | 57.5 | 20.9 | 56.1 | 37.9 | 61.9 |
| 117° C. [% by weight] | 26.0 | 7.6 | 39.0 | 10.4 | 23.0 | 3.7 |
| 122° C. [% by weight] | 18.7 | 5.2 | 21.9 | 7.5 | 15.1 | 2.1 |
| 125° C. [% by weight] | 4.6 | — | 5.5 | — | 3.9 | — |

TABLE-continued

|  | Example 1 | Comparative Example A | Example 2 | Comparative Example B | Example 3 | Comparative Example C |
|---|---|---|---|---|---|---|
| Xylene-insoluble fraction at |  |  |  |  |  |  |
| 107° C. [% by weight] | 81.9 | 70.3 | 87.3 | 74.0 | 79.9 | 67.7 |
| 112° C. [% by weight] | 49.3 | 12.8 | 66.4 | 17.9 | 42.0 | 5.8 |
| 117° C. [% by weight] | 23.3 | 5.2 | 27.4 | 7.5 | 19.0 | 2.1 |
| 122° C. [% by weight] | 4.6 | — | 5.5 | — | 3.9 | — |
| Q ($M_w/M_n$) | 4.2 | 4.5 | 4.3 | 4.7 | 4.2 | 4.3 |
| DSC melting point [° C.] | 167.5 | 166.2 | 168.0 | 166.6 | 167.2 | 165.7 |
| Tensile modulus of elasticity [N/mm$^2$] | 2280 | 2140 | 2350 | 2210 | 2240 | 2090 |
| Chlorine content of the polymer [ppm] | 9.2 | 11.7 | 7.8 | 13.6 | 10.1 | 13.5 |
| Productivity [g of polymer/g of titanium-containing solid component] | 31 000 | 24 200 | 35 900 | 20 800 | 27 900 | 21 000 |

A comparison of novel Examples 1 to 3 with Comparative Examples A to C clearly shows that the novel propylene homopolymers have a significantly higher content of most highly isotactic polymer fractions and smaller xylene-soluble fractions. Accordingly, they are highly crystalline and have a higher DSC melting point and higher rigidity (tensile modulus of elasticity). Moreover, they have a lower chlorine content. Furthermore, higher productivity is achieved with increasing amount of further (external) electron donor c) in the novel process—in contrast to conventional processes.

We claim:

1. A process for the preparation of propylene homopolymers having from 0.4 wt percent to 0.6 wt percent xylene soluble fraction and a halogen content of 7.8 ppm to 10.1 ppm by polymerizing propylene at from 20 to 50° C. and from 1 to 100 bar in the presence of a Ziegler-Natta catalyst system containing, as active components, wherein the process comprises a) reacting a titanium halide with a chlorine-free magnesium alkyl compound, an inorganic oxide as a carrier, a $C_1$–$C_8$-alkanol and an electron donor compound by a method in which, in a first stage, a solution of the chlorine-free magnesium alkyl compound in an inert solvent is added to the inorganic oxide as a carrier, this mixture is allowed to react for from 0.5 to 5 hours at from 10 to 120° C. and then reacted, at from −20° to 80° C. with constant mixing, with a $C_1$–$C_8$-alkanol in at least a 1.3 fold molar excess, based on the compound of magnesium, to give a chlorine-free intermediate, the titanium halide and the electron donor compound are then added to said intermediate, the resulting mixture is allowed to react for at least 10 minutes at from 10 to 150° C. and the solid substance thus obtained is then filtered off as washed in a liquid alkane and, as cocatalyst, b) an aluminum compound and c) a further electron donor compound, the molar ratio of the aluminum compound b) to the further electron donor compound c) in the polymerization being from 1.5:1 to 9:1.

2. A process for the preparation of propylene homopolymers as claimed in claim 1, wherein the molar ratio of the aluminum compound b) to the further electron donor compound c) is from 2:1 to 8:1.

3. A process for the preparation of propylene homopolymers as claimed in claim 1, wherein ethanol is used as a $C_1$–$C_8$-alkanol in the preparation of the titanium-containing solid component a) in the first stage.

4. A process for the preparation of propylene homopolymers as claimed in claim 1, wherein a di-$C_1$–$C_{10}$-alkylmagnesium is used as the chlorine-free compound of magnesium in the preparation of the titanium-containing solid component a).

5. A process for the preparation of propylene homopolymers as claimed in claim 1, wherein an inorganic oxide which has a pH of from 1 to 6.5, a mean particle diameter of from 5 to 200 μm and cavities or channels having a mean particle diameter of from 1 to 20 μm and whose macroscopic volume fraction, based on the total particle, is from 5 to 30% is used as a carrier in the preparation of the titanium-containing solid component a).

6. A process for the preparation of propylene homopolymers as claimed in claim 1, wherein silica gel is used as the inorganic oxide in the preparation of the titanium-containing solid component a).

7. A process for the preparation of propylene homopolymers as claimed in claim 1, wherein silica gel is used as the inorganic oxide in the preparation of the titanium-containing solid component a).

8. A process for the preparation of propylene homopolymers as claimed in claim 1, wherein a trialkylaluminum compound whose alkyl groups are each of 1 to 8 carbon atoms is used as the aluminum compound b).

9. A process for the preparation of propylene homopolymers as claimed in claim 3, wherein at least one organosilicon compound of formula (I)

$$R^1{}_nSi(OR^2)_{4-n} \qquad (I)$$

where the radicals $R^1$ are identical or different as are each $C_1$–$C_{20}$-alkyl, 5- to 7-membered cycloalkyl, which in turn may be substituted by $C_1$–$C_{10}$-alkyl, or are $C_6$–$C_{28}$-aryl or $C_6$–$C_{18}$-aryl-$C_1$–$C_{10}$-alkyl, the radicals $R_2$ are identical or different and are each $C_1$–$C_{20}$-alkyl and n is 1, 2, or 3, is used as further electron donor compound c).

* * * * *